United States Patent [19]

Tamaru et al.

[11] Patent Number: 4,933,313
[45] Date of Patent: Jun. 12, 1990

[54] CATALYST FOR CONVERSION OF CARBON MONOXIDE

[75] Inventors: Akio Tamaru; Yoshikazu Ohshima, both of Kitakyushu; Hidekichi Hashimoto, Nakama; Koushi Honda, Mizumaki, all of Japan

[73] Assignee: Mitsubishi Kasei Corporation, Tokyo, Japan

[21] Appl. No.: 260,708

[22] Filed: Oct. 21, 1988

[30] Foreign Application Priority Data

Oct. 21, 1987 [JP] Japan .................. 62-266003

[51] Int. Cl.$^5$ .................... B01J 23/78; B01J 23/86
[52] U.S. Cl. ............................ 502/306; 423/656
[58] Field of Search .................. 502/306; 423/656

[56] References Cited

U.S. PATENT DOCUMENTS

| 2,063,302 | 2/1971 | Eversole | 23/234 |
| 2,197,707 | 3/1974 | Crittenden | 23/212 |
| 2,567,140 | 9/1951 | Ashley et al. | 502/306 |
| 3,577,354 | 3/1978 | Kehl | 252/468 |
| 4,598,062 | 7/1986 | Schneider et al. | 502/306 |

FOREIGN PATENT DOCUMENTS

| 0126425 | 11/1984 | European Pat. Off. . |
| 247922 | 7/1969 | U.S.S.R. ............... 502/306 |
| 1536652 | 12/1978 | United Kingdom . |

OTHER PUBLICATIONS

Atwood et al., "Activity of an Iron Oxide-Chromium Oxide Water-Gas Shift Catalyst", Ind. and Eng. Chem., vol. 45, No. 2, pp. 424–426 (1953).
Japanese Patent No. 128285 published on Sep. 14, 1938, Publication No. Sho 13-3830, "A Process for Preparing a Catalyst For Producing Hydrogen" Kogyo Kagaku Zasshi, vol. 40, No. 10 published on Oct., 1937.

*Primary Examiner*—W. J. Shine
*Attorney, Agent, or Firm*—Oblon, Spivak, McClelland, Maier & Neustadt

[57] ABSTRACT

A catalyst for conversion of carbon monoxide in water gas reaction, which comprises iron oxide, chromium oxide and magnesium oxide in the proportions of the from 40 to 85% by weight computed as $Fe_2O_3$, from 12 to 45% by weight computed as $Cr_2O_3$ and from 3 to 15% by weight computed as MgO, respectively.

5 Claims, No Drawings

CATALYST FOR CONVERSION OF CARBON MONOXIDE

The present invention relates to a catalyst of an iron oxide-chromium oxide system for conversion of carbon monoxide. More particularly, the present invention relates to a catalyst useful for catalytically reacting carbon monoxide with steam for the production of hydrogen, which is effective for suppressing side reactions and yet has improved catalytic activities which are less susceptible to deterioration.

The reaction which converts carbon monoxide and steam to hydrogen and carbon dioxide is known as the water gas reaction. This reaction is an important process in the chemical industry and has been known a long time. The reaction may be represented by the following formula:

$$CO + H_2O \rightleftharpoons H_2 + CO_2$$

As the catalyst for this reaction, it is usual to employ a catalyst of an iron oxide-chromium oxide system having excellent poison resistance and having a long life at high temperatures. Such a catalyst is used at a temperature of from 350° to 500° C. under a pressure of from 10 to 35 kg/cm$^2$ for an industrial operation. It is known that under such conditions, undesirable methane is produced as a by-product by a Fisher-Tropsch reaction.

The amount of the by-product methane is extremely small and negligible at the initial stage in the use of the catalyst, but it gradually increases thereafter, and after about 2 months from the initiation, such by-product methane tends to form constantly.

If hydrogen produced by such a process is used for the synthesis of ammonia in a usual manner, the by-product methane accumulates in the tower for the ammonia synthesis, thus leading to undesirable results.

As a method for controlling the by-product methane, it is effective to increase the ratio of steam to carbon monoxide, but such a method is economically disadvantageous.

On the other hand, it has been proposed to incorporate aluminum oxide or magnesium oxide to the iron oxide-chromium oxide catalyst to improve the properties such as the strength, heat resistance and poison resistance.

Japanese Unexamined Patent Publication No. 216845/1985 (which corresponds to EP No. 0126425 and U.S. Pat. No. 4,598,062) discloses that a catalyst prepared by adding magnesium oxide to an iron oxide-chromium oxide for the purpose of improving the mechanical strength of the catalyst, is effective to substantially suppress the formation of methane. The catalyst disclosed in this publication has a composition comprising from 80 to 90% by weight of iron oxide, from 7 to 11% by weight of Cr$_2$O$_3$ and from 2 to 10% by weight, preferably from 4 to 6% by weight, of MgO.

However, according to the experiments conducted by the present inventors, a catalyst prepared by adding magnesium oxide to an iron oxide-chromium oxide catalyst tends to reduce catalytic activities although the formation of methane can thereby be suppressed. A commercially available iron oxide-chromium oxide catalyst for the conversion reaction usually has a chromium oxide content of from about 9 to about 11% by weight. If magnesium oxide is added to such a catalyst, the catalytic activities deteriorate, such being practically disadvantageous.

The present inventors have conducted extensive researches for the improvement of the iron oxide-chromium oxide system catalyst. As a result, it has been surprisingly found that by adjusting the composition of the iron oxide-chromium oxide-magnesium oxide to a certain range, not only the formation of by-product methane can be suppressed, but also it is possible to obtain a catalyst for conversion of carbon monoxide having catalytic activities higher than the commercially available catalyst containing no magnesium oxide. The present invention has been accomplished on the basis of this discovery. Namely, it is an object of the present invention to provide a catalyst for conversion of carbon monoxide which has a high catalytic activity without substantial production of undesirable methane.

The present invention provides a catalyst for conversion of carbon monoxide, which comprises iron oxide, chromium oxide and magnesium oxide in the proportions of from 40 to 85% by weight computed as Fe$_2$O$_3$, from 12 to 45% by weight computed as Cr$_2$O$_3$ and from 3 to 15% by weight computed as MgO, respectively.

Now, the present invention will be described in detail with reference to the preferred embodiments.

In the catalyst for conversion of carbon monoxide composed of iron oxide-chromium oxide-magnesium oxide, the contents of chromium oxide and magnesium oxide are important.

The content of chromium oxide in the catalyst of the present invention is from 12 to 45% by weight, preferably from 14 to 45% by weight, more preferably from 14 to 30% by weight. If the content is too small, it is difficult to obtain a catalyst having high catalytic activities. On the other hand, if the content is too high, the formation of by-product methane tends to be substantial.

On the other hand, the content of magnesium oxide is from 3 to 15% by weight, preferably from 5 to 15% by weight more preferably from 5 to 12% by weight. If this content is too small, no adequate effect for suppressing by-product methane will be expected. If the content is too high, the catalytic activities tend to deteriorate.

Thus, chromium oxide and magnesium oxide have mutually opposing effects. However, when the molar ratio of magnesium oxide to chromium oxide is adjusted to a level of from 1 to 2, preferably from 1.1 to 2, within the above composition, it is possible to obtain a catalyst having high catalytic activities and being capable of suppressing the formation of by-product methane.

For the preparation of the catalyst of the present invention, various methods may be employed which are commonly used for the preparation of catalysts of this type. Iron oxide, chromium oxide and magnesium oxide, or precursors thereof are used as starting materials, and they are mixed by a conventional method such as precipitation, impregnation or kneading to have predetermined proportions of iron, chromium and magnesium, and if necessary, converted to oxides by a usual means such as calcining.

For example, it is possible to employ a precipitation method wherein an aqueous solution containing a water-soluble iron compound such as iron nitrate, iron sulfate, iron chloride or iron acetate as an iron source, a water-soluble chromium compound such as sodium dichromate chromium nitrate, chromium sulfate or chromium acetate as a chromium source and a water-soluble magnesium compound such as magnesium nitrate or magnesium sulfate as a magnesium source in the desired proportions of iron, chromium and magnesium, is precipitated by means of an aqueous solution of e.g. sodium hydroxide or sodium carbonate. An impregnation method wherein an aqueous solution of a water-soluble magnesium compound such as magnesium nitrate or magnesium acetate is added or sprayed to iron-chromium precipitates obtained by using the above starting materials or to a dried product of such precipitates, or a kneading method wherein iron-chromium precipitates or a dried product of such precipitates is kneaded with magnesium oxide or a magnesium compound such as magnesium hydroxide or magnesium carbonate are also employed.

In either one of these methods, if a component added in a form other than its oxide is present, it is necessary to convert it to its oxide by e.g. calcining or blowing air thereto before the catalyst is actually used.

The catalyst of the present invention obtained as described above is usually molded without a carrier, or together with a carrier or a molding assistant such as graphite, followed by drying and, if necessary, calcining. Otherwise, it is possible to support a solution of the above-mentioned catalyst components on a carrier such as alumina, silica, glass or ceramics, followed by drying and calcining.

The drying may be conducted at a temperature of from 200° to 220° C. for a few hours. When calcining is conducted, it may be carried out at a temperature of from 400° to 500° C. for from about one to about 3 hours.

Further, the catalyst of the present invention may contain metals other than the above-mentioned metal components, for example, a transitional metal such as titanium, vanadium or manganese, an alkaline earth metal such as calcium or barium, yttrium and a rare earth metal such as lanthanum or cerium, as the case requires.

The catalyst of the present invention may be used in a conventional manner, for example, at a temperature of from 300° to 500° C. under a pressure of from atmospheric pressure to 50 kg/cm², or under a pressure of from 10 to 35 kg/cm² for an industrial operation.

Now, the present invention will be described in further detail with reference to Examples. However, it should be understood that the present invention is by no means restricted to such Examples. In the following Examples, the composition of the catalyst is represented by % by weight in each case.

EXAMPLE 1

An aqueous solution having 1,000 g of ferrous sulfate $FeSO_4.7H_2O$, 111.0 g of magnesium sulfate $MgSO_4.7H_2O$ and 114.0 g of sodium dichromate $Na_2Cr_2O_7.2H_2O$ dissolved in 2,370 g of water, was poured into a 15% sodium hydroxide aqueous solution containing 385 g of sodium hydroxide. The solution containing formed precipitates, was heated at 60° C. for 3 hours while blowing air thereinto. The precipitates were subjected to filtration, and the cake thereby obtained was suspended and washed a few times with deionized water of 60° C. At the final suspending operation, 13 g of graphite was added and suspended, and the suspension was subjected to filtration. The cake thereby obtained was dried at 220° C. for a few hours, then pulverized and molded into tablets having a diameter of 6.5 mm and a length of 6.4 mm.

The composition of the catalyst was as follows:

| $Fe_2O_3$ (%) | $Cr_2O_3$ (%) | MgO (%) |
|---|---|---|
| 79.0 | 16.0 | 5.0 |

COMPARATIVE EXAMPLE 1

A catalyst was prepared in the same manner as in Example 1 except that the amount of magnesium sulfate was changed to 39.4 g, the amount of sodium dichromate was changed to 57.0 g, the amount of water dissolving the entire catalyst components was changed to 2,100 g, and the amount of sodium hydroxide contained in the 15% sodium hydroxide aqueous solution was changed to 360 g. The composition of this catalyst was as follows.

| $Fe_2O_3$ (%) | $Cr_2O_3$ (%) | MgO (%) |
|---|---|---|
| 89.0 | 9.0 | 2.0 |

COMPARATIVE EXAMPLE 2

A catalyst was prepared in the same manner as in Example 1 except that the amount of magnesium sulfate was changed to 101.7 g, the amount of sodium dichromate was changed to 57.0 g, and the amount of water dissolving the entire catalyst components was changed to 2,170 g. The composition of this catalyst was as follows:

| $Fe_2O_3$ (%) | $Cr_2O_3$ (%) | MgO (%) |
|---|---|---|
| 86.3 | 8.7 | 5.0 |

EXAMPLE 2

A catalyst was prepared in the same manner as in Example 1 except that the amount of magnesium sulfate was changed to 181.5 g, the amount of sodium dichromate was changed to 155.2 g, the amount of water dissolving the entire catalyst components was changed to 2,580 g, and the amount of sodium hydroxide contained in the 15% sodium hydroxide aqueous solution was changed to 360 g. The composition of this catalyst was as follows.

| $Fe_2O_3$ (%) | $Cr_2O_3$ (%) | MgO (%) |
|---|---|---|
| 72.5 | 20.0 | 7.5 |

EXAMPLE 3

A catalyst was prepared in the same manner as in Example 1 except that the amount of magnesium sulfate was changed to 270.0 g, the amount of sodium dichromate was changed to 216.4 g, and the amount of water dissolving the entire catalyst components was changed to 2,880 g, and the amount of sodium hydroxide contained in the 15% sodium hydroxide aqueous solution was changed to 450 g. The composition of this catalyst was as follows.

| $Fe_2O_3$ (%) | $Cr_2O_3$ (%) | MgO (%) |
|---|---|---|
| 65.0 | 25.0 | 10.0 |

By using the catalysts prepared in the foregoing Examples and a commercially available catalyst, carbon monoxide conversion reactions were conducted under the following conditions, whereby the conversion and the amount of by-product methane were measured, and the rate constant K was calculated. The results are shown in Table 1.

| Reaction conditions | |
|---|---|
| Amount of catalyst: | 150 cc |
| Reaction temperature: | 360° C. |
| Reaction pressure: | .29 kg/cm$_2$ |
| H$_2$O/gas ratio: | 0.6 |
| Gas composition: (% by volume) | CO 14%, CO$_2$ 10%, H$_2$ 54%, N$_2$ 22% |
| Space velocity: | 5100 hr$^{-1}$ (as dry gas) |

As the commercially available catalyst, the following product was used.

Catalyst for high temperature conversion (G-3L) manufactured by Nissan Gardler Co.

Fe$_2$O$_3$-Cr$_2$O$_3$: 80-8

The rate constant was calculated by the following equation.

K = dry gas space velocity $\log_e \{1/(1 - \text{conversion}/\text{equilibrium conversion})\}$

TABLE 1

(Results upon expiration of 8 hours from the initiation of the reaction)

| Catalyst | Catalyst composition | | | | Rate constant K(hr$^{-1}$) | By-product methane (ppm) |
|---|---|---|---|---|---|---|
| | Fe$_2$O$_3$ (%) | Cr$_2$O$_3$ (%) | MgO (%) | MgO/Cr$_2$O$_3$ (molar ratio) | | |
| Comparative Example 1 | 89.0 | 9.0 | 2.0 | 0.84 | 4,700 | 30 |
| Comparative Example 2 | 86.3 | 8.7 | 5.0 | 2.17 | 3,200 | 2 |
| Example 1 | 79.0 | 16.0 | 5.0 | 1.18 | 5,200 | 4 |
| Example 2 | 72.5 | 20.0 | 7.5 | 1.41 | 6,300 | 2 |
| Example 3 | 65.0 | 25.0 | 10.0 | 1.51 | 6,000 | 2 |
| Commercially available catalyst | 90 | 10 | 0 | 0 | 5,300 | 30 |

By-product methane: Gas concentration after the reaction

We claim:

1. A catalyst for conversion of carbon monoxide, which comprises: from 40 to 85% by weight of iron oxide, computed as Fe$_2$O$_3$, from 14 to 45% by weight of chromium oxide, computed as Cr$_2$O$_3$ and from 3 to 15% by weight of magnesium oxide, computed as MgO, the molar ratio of magnesium oxide to chromium oxide in the catalyst ranging from 1 to 2.

2. The catalyst according to claim 1, wherein the content of chromium oxide is from 14 to 30% by weight as Cr$_2$O$_3$.

3. The catalyst according to claim 1, wherein the content of magnesium oxide is from 5 to 15% by weight as MgO.

4. The catalyst according to claim 1, wherein the content of magnesium oxide is from 5 to 12% by weight as MgO.

5. The catalyst according to claim 1, wherein the molar ratio of magnesium oxide to chromium oxide is from 1.1 to 2.